United States Patent
Yang et al.

(10) Patent No.: US 8,297,720 B2
(45) Date of Patent: Oct. 30, 2012

(54) DEVICE HOUSING WITH LATCHING MECHANISM

(75) Inventors: Xin Yang, Shenzhen (CN); Wei Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 209 days.

(21) Appl. No.: 12/820,284

(22) Filed: Jun. 22, 2010

(65) Prior Publication Data

US 2011/0193459 A1    Aug. 11, 2011

(30) Foreign Application Priority Data

Feb. 5, 2010    (CN) .......................... 2010 1 0301311

(51) Int. Cl.
*A47B 97/00* (2006.01)
(52) U.S. Cl. .................................................. 312/223.2
(58) Field of Classification Search .................. 312/215, 312/222, 223.1, 223.2; 292/80, 81, 87, 88, 292/137, 138, 145, 146, 147, 323, DIG. 11, 292/DIG. 37
See application file for complete search history.

(56) References Cited

U.S. PATENT DOCUMENTS

| | | | | |
|---|---|---|---|---|
| 1,185,422 A * | 5/1916 | Mammelli | ...... | 292/227 |
| 1,931,695 A * | 10/1933 | Hall | ...... | 292/17 |
| 2,313,711 A * | 3/1943 | Jacobi | ...... | 70/145 |
| 2,526,791 A * | 10/1950 | Wroblewski | ...... | 403/326 |
| 3,520,568 A * | 7/1970 | White et al. | ...... | 292/255 |
| 4,557,456 A * | 12/1985 | Mueller | ...... | 248/499 |
| 5,040,917 A * | 8/1991 | Camuffo | ...... | 403/408.1 |
| 5,626,374 A * | 5/1997 | Kim | ...... | 292/170 |
| 6,442,021 B1 * | 8/2002 | Bolognia et al. | ...... | 361/679.34 |
| 6,952,341 B2 * | 10/2005 | Hidaka et al. | ...... | 361/679.32 |
| 6,954,992 B2 * | 10/2005 | Hwang | ...... | 34/108 |
| 7,261,383 B2 * | 8/2007 | Fan et al. | ...... | 312/223.2 |
| 7,864,522 B1 * | 1/2011 | Peng et al. | ...... | 361/679.33 |
| 2008/0036217 A1 * | 2/2008 | Wang | ...... | 292/146 |
| 2009/0320534 A1 * | 12/2009 | Lee et al. | ...... | 70/158 |

* cited by examiner

*Primary Examiner* — James O Hansen
*Assistant Examiner* — Matthew Ing
(74) *Attorney, Agent, or Firm* — Altis Law Group, Inc.

(57) ABSTRACT

A device housing with latching mechanism includes a base, a cover and a latching mechanism. The cover includes a first edge and an opposite second edge. The first edge is rotatably connected to the base, and the second edge is connected to the cover by the latching mechanism. The cover defines an opening. The latching mechanism includes a support secured to the base, a button, and a resilient member arranged between the support and the button. The button includes a button body with a side surface and at least one flexible arm protruding from the side surface. Each at least one flexible arm forms a protrusion thereon. The button body extends through the opening and abuts against edges of the opening to connect the cover to the base.

9 Claims, 4 Drawing Sheets

DEVICE HOUSING WITH LATCHING MECHANISM

BACKGROUND

1. Technical Field

The present disclosure relates to device housings and, more particularly, to a device housing utilizing a latching mechanism connecting a base and a cover.

2. Description of the Related Art

Generally, a desktop computer housing includes a base and a cover connected to the base. The cover defines hooks retained in grooves of the base. The cover and the base are further connected by fasteners. To detach the cover, an auxiliary tool such as a screw driver is usually used to loosen or remove the fasteners. When there is no screwdriver at hand, a user may not be able to detach the cover.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the device housing with latching mechanism. Moreover, in the drawings, like reference numerals designate corresponding parts throughout the several views.

DETAILED DESCRIPTION

Figure 1:
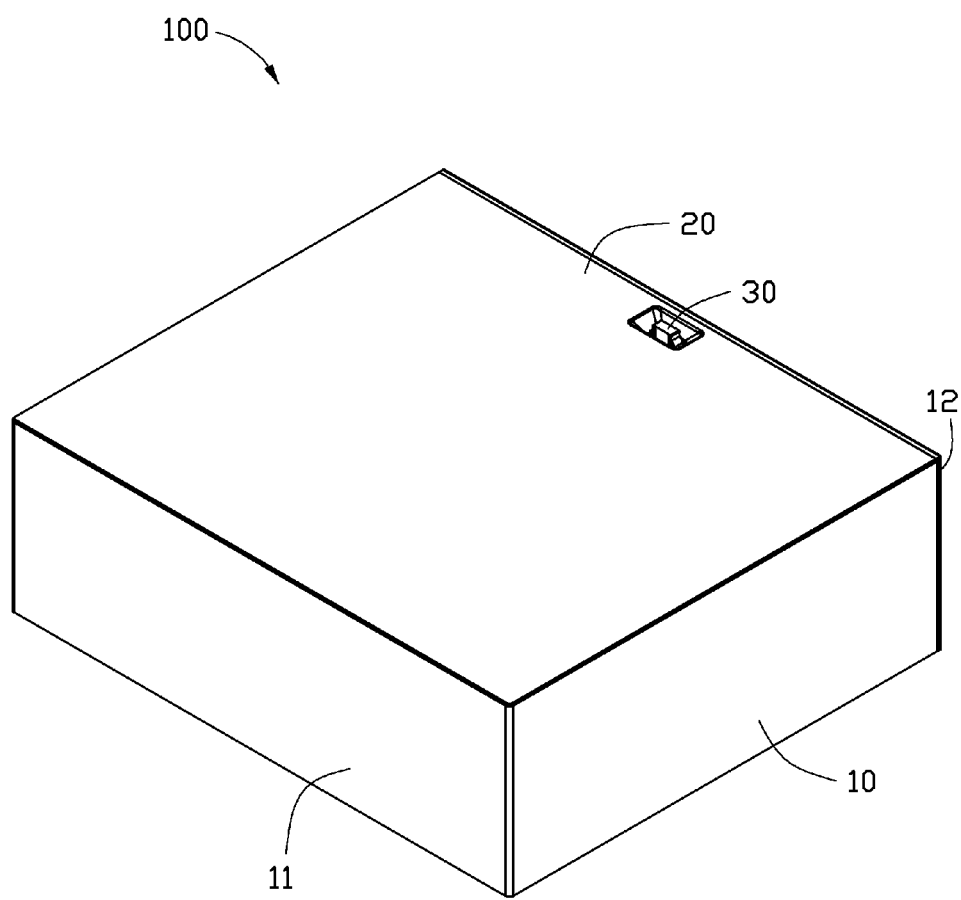
FIG. 1 is an isometric view of a device housing with latching mechanism in accordance to an exemplary embodiment.

Referring to FIG. 1, a device housing 100 includes a base 10, a cover 20, and a latching mechanism 30. The base 10 includes a first side plate 11 and a second side plate 12 parallel to each other. One edge of the cover 20 is rotatably connected to the first side plate 11. An opposite edge of the cover 20 is connected to the second side plate 12 through the latching mechanism 30.

Figure 2:
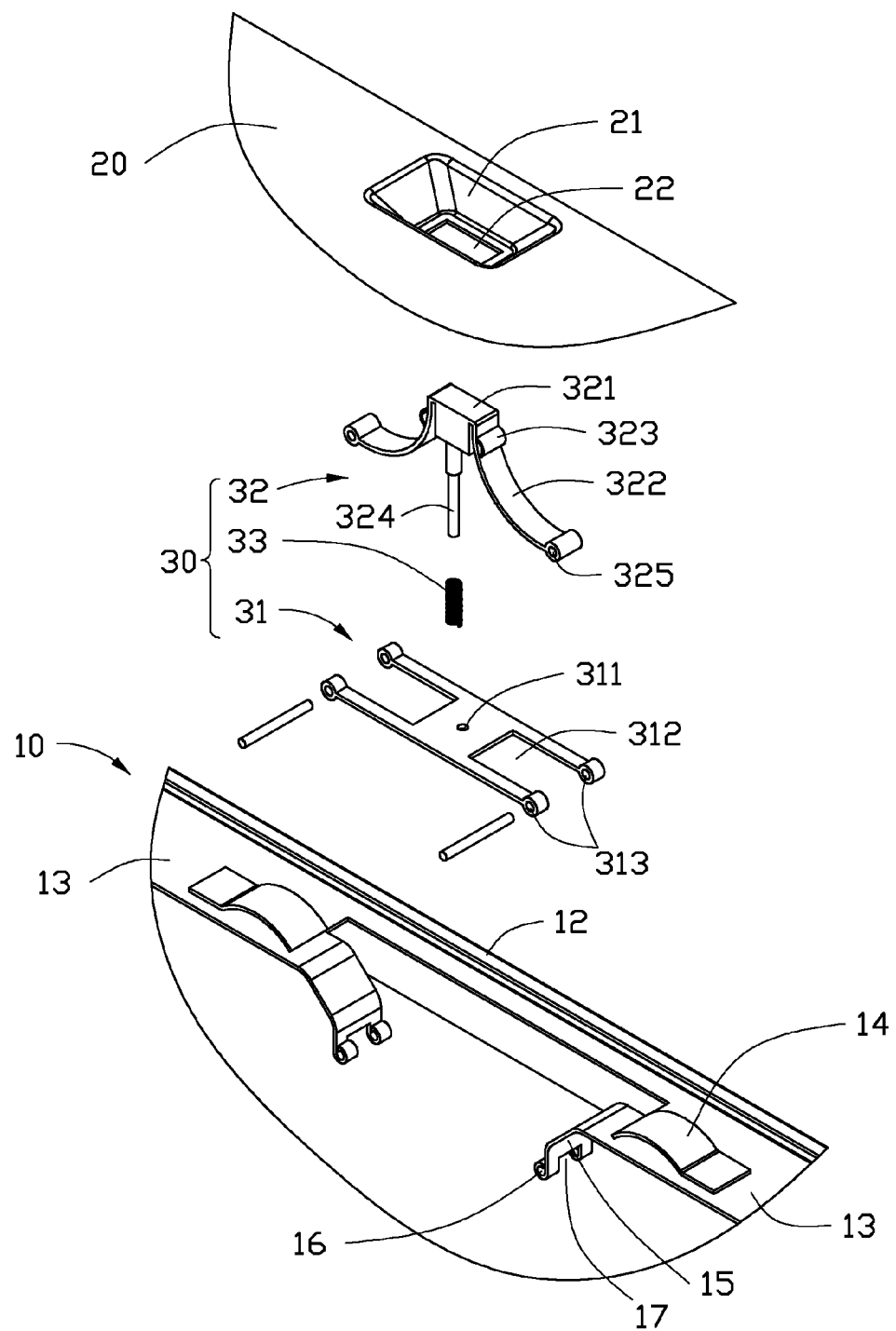
FIG. 2 is a partially exploded view of the device housing of FIG. 1.

Referring to FIG. 2, the base 10 also includes two spaced fastening plates 13 protruding from the inner surface of the second side plate 12, and a plurality of elastic members 14 on the fastening plates 13. In the exemplary embodiment, the elastic members 14 are spring clips arched toward its distal end, allowing the elastic members 14 to elastically deflect toward the fastening plates 13. A fastening portion 15 extends from an edge of each fastening plate 13 toward the bottom of the base 10. An edge of each fastening portion 15 is curled to form two aligned first pivot holes 16 and a first notch 17 between the first pivot holes 16.

The cover 20 includes a recessed portion 21 corresponding to the space between the two fastening plates 13. The cover 20 defines a rectangular opening 22 through the bottom of the recessed portion 21.

The latching mechanism 30 includes a support 31, a button 32, and a resilient member 33 arranged between the button 32 and the support 31.

The support 31 is a rectangular plate defining a center hole 311. The support 31 defines a second notch 312 and a pair of second pivot holes 313 corresponding to each fastening portion 15.

The button 32 includes a button body 321, at least one flexible arm 322, and a post 324. The flexible arms 322 protrude from the side surface of the button body 321. Each flexible arm 322 forms a protrusion 323 on one end and defines a third pivot hole 325 in the opposite free end. The post 324 protrudes from the button body 321 toward the support 31. In the exemplary embodiment, the resilient member 33 is a coil spring coiled around the post 324 to apply a pushing force to the button body 321.

In assembly, the fastening portions 15 are received in the second notches 312 of the support 31 and the flexible arms 322 are received in the first notches 17. With the first pivot holes 16, the second pivot holes 313, and the third pivot hole 325 aligned, the pivots (not labeled) extend through the pivot holes to connect the support 31 and the button 32 to the base 10.

Figure 3:
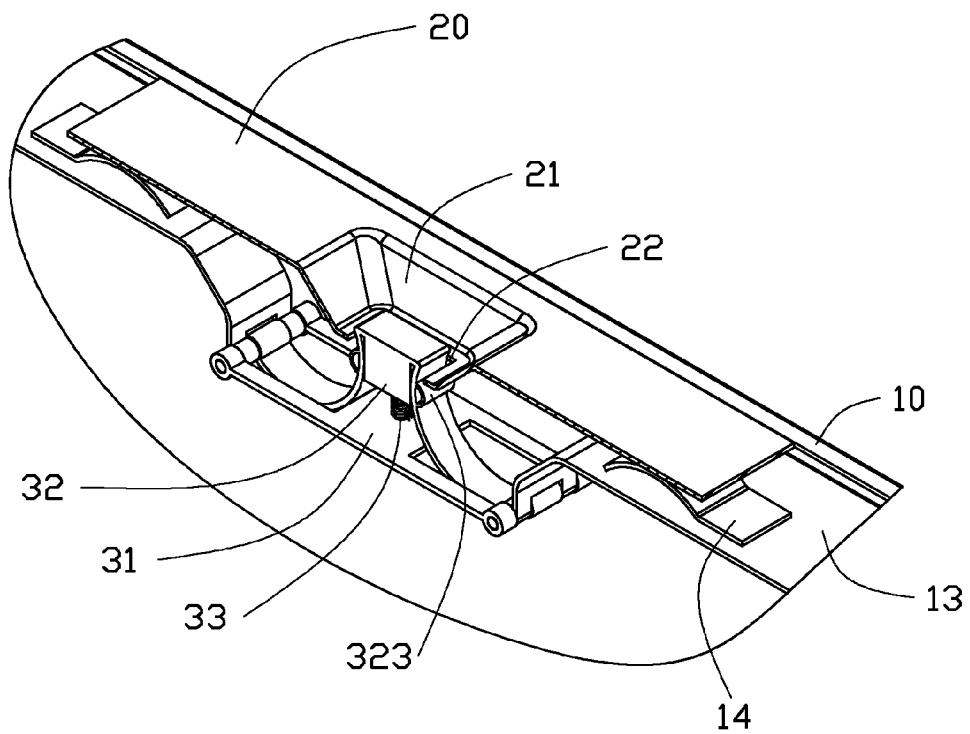
FIG. 3 is a partial, assembled view of FIG. 1, showing the cover in an unlatched state.

Referring to FIG. 3, to latch the device housing 100, the cover 20 is pressed down toward the base 10, causing the elastic member 14 and the resilient member 33 to compress and the flexible arm 322 to flex to the button body 321.

Figure 4:
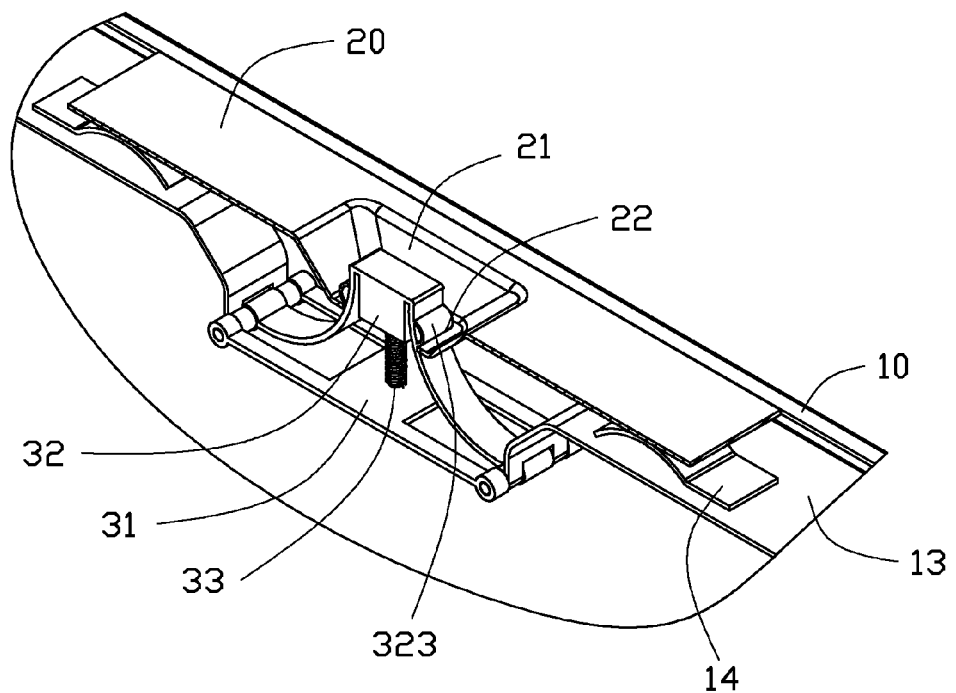
FIG. 4 is a partial, assembled view of FIG. 1, showing the cover in a latched state.

Referring to FIG. 4, pressing the cover 20 will also cause the protrusion 323 to pass over the opening 22, and the resilient member 33 and the elastic member 14 apply a force to the button body 321 and the cover 20 respectively, causing the protrusion 323 to abut tightly against edges of the opening 22, which can latch the cover 20 to the base 10.

Referring to FIG. 3-4, when opening the device housing 100, the button body 321 of the button 32 is pushed until the flexible arm 322 to flex to the button body 321 that the protrusions 323 pass through the opening 22 again, releasing the cover 20 from limitation of the protrusions 323.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A device housing, comprising:
   a base with a first side plate and an opposite second side plate;
   a cover defining an opening, wherein a first edge of the cover is rotatably connected to the first side plate; and
   a latching mechanism connecting a second edge of the cover and the second side plate, comprising:
   a support secured to the base;
   a button comprising a button body with a side surface and at least one arc-shaped flexible arm protruding from the side surface of the button body, wherein the at least one flexible arm is elastically deformable toward the button body and comprises a protrusion thereon; and
   a resilient member arranged between the support and the button;
   wherein the resilient member applies a force to the button body, causing the protrusion to pass through the opening thus abutting against edges of the opening to latch the cover to the base, and when the button is pressed, the at least one flexible arm deflects to the button body to cause the protrusion to pass through the opening to unlatch the cover from the base.

2. The device housing as described in claim 1, wherein the second side plate comprises an inner surface and two spaced fastening plates protruding from the inner surface, and the support is secured between the two fastening plates.

3. The device housing as described in claim 2, wherein a plurality of elastic members are disposed on the two fastening plates to apply a force to the cover, causing the protrusion to abut against the edges of the opening tightly.

4. The device housing as described in claim 3, wherein the elastic members are spring clips arched toward its distal end, allowing the elastic members to elastically deflect toward the fastening plates.

5. The device housing as described in claim 1, wherein the cover defines a recessed portion comprising a bottom and the opening is defined through the bottom.

6. The device housing as described in claim 1, wherein the number of the at least one flexible arm is two.

7. The device housing as described in claim 6, wherein two distal ends of the two flexible arms are rotatably connected to the support.

8. The device housing as described in claim 1, wherein the button body defines a post and the support defines a center hole corresponding to the post, the post extends through the center hole, allowing the button to move upward and downward with respect to the support.

9. The device housing as described in claim 8, wherein the resilient member is a coil spring coiled around the post to apply a pushing force to the button body.

* * * * *